(12) United States Patent
Lin et al.

(10) Patent No.: US 6,930,857 B1
(45) Date of Patent: Aug. 16, 2005

(54) CONTINUOUS SEPARATOR PLATE FOR USE WITH A DISK DRIVE

(75) Inventors: Chen-Chi Lin, San Jose, CA (US); Aaron D. Little, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 59 days.

(21) Appl. No.: 10/425,886

(22) Filed: Apr. 28, 2003

(51) Int. Cl.$^7$ .............................................. G11B 33/08
(52) U.S. Cl. .................................................. 360/97.02
(58) Field of Search ......................... 360/97.02, 97.01, 360/97.03, 98.01; 369/13.24

(56) References Cited

U.S. PATENT DOCUMENTS

| | | | |
|---|---|---|---|
| 4,068,851 A * | 1/1978 | Yamamura | 369/79 |
| 4,329,722 A * | 5/1982 | West | 360/97.03 |
| 4,583,213 A * | 4/1986 | Bracken et al. | 369/261 |
| 6,239,943 B1 * | 5/2001 | Jennings et al. | 360/97.02 |
| 6,501,614 B1 * | 12/2002 | Kang et al. | 360/97.01 |
| 6,542,328 B2 | 4/2003 | Harrison et al. | |
| 6,636,379 B2 * | 10/2003 | Rannow et al. | 360/97.02 |
| 6,771,458 B2 * | 8/2004 | Kim et al. | 360/97.02 |

* cited by examiner

Primary Examiner—Angel Castro
(74) Attorney, Agent, or Firm—Milad G. Shara, Esq.; Blakely Sokoloff Taylor & Zafman (57) ABSTRACT

Disclosed is a continuous separator plate for use with a disk drive. The continuous separator plate includes a substantially circular continuous outer circumference and a substantially circular continuous inner circumference. A continuous radial portion may be defined between the substantially circular continuous outer and inner circumferences. The continuous radial portion is to be disposed between at least one disk of the disk drive and either the cover or the base of the disk drive, respectively. Further, the continuous radial portion includes a disk side that faces the at least one disk and an opposite side that faces either the cover or the base, respectively. The continuous separator plate further includes a head stack assembly (HSA) accommodation section to accommodate an HSA.

26 Claims, 7 Drawing Sheets

CONTINUOUS SEPARATOR PLATE FOR USE WITH A DISK DRIVE

BACKGROUND OF THE INVENTION

1. Field of the Invention

The present invention relates to a continuous separator plate for use with a disk drive. More particularly, the present invention relates to a continuous separator plate for use with a disk drive that has improved shock resistance allowing for a smaller gap between the continuous separator plate and a rotating disk of the disk drive, which further provides for improved air dampening characteristics to aid in suppressing rotating disk and head vibration.

2. Description of the Prior Art and Related Information

A huge market exists for hard disk drives for mass-market host computer systems such as servers, desktop computers, and laptop computers. To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity, that provide for faster access to data, and at the same time conform to decreasingly smaller exterior sizes and shapes often referred to as "form factors." Specific methods that are presently being employed to decrease access times to data are to increase the density of tracks on each disk and to increase the rotational speed of the disk(s) of the disk drive.

Satisfying these competing constraints of low-cost, small size, high capacity, and rapid access to data requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes-circuitry for processing signals and controlling operations. Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of actuator arms projecting parallel to each other and perpendicular to the axis of the bore. The prefabricated head stack assembly also includes head gimbal assemblies that are supported by the actuator arms. Each head gimbal assembly includes a load beam and a head supported by the load beam. The head is positioned over a track on a recording surface of the disk to write or read data to or from the track.

As previously discussed, a typical head gimbal assembly includes a load beam, and further, a gimbal is attached to an end of the load beam, and the head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Because of the competitive pressure to continually develop hard disk drives that provide for faster access to data, techniques and solutions to problems are continuously being developed to increase the reliability of accessing data and to decrease the access time to data. One source of problems related to the performance of disk drives are track misregistration errors (TMRs). Track misregistration errors detrimentally affect the performance of the disk drive and increase the access time to data.

As previously discussed, one particular method that is presently being employed to decrease access times to data is to increase the rotational speed of the disk(s) of the disk drive. Although increasing the rotational speed of the disks of the disk drive advantageously decreases access time to data, or latency times (i.e. time spent waiting for a selected data block to reach the head as a particular disk rotates), higher rotational speeds tend to induce a greater degree of turbulence in the airflow established by the rotating disks. It is desirable to have laminar or uniform airflow about the disks, HSA, and heads, as opposed to turbulent airflow. Turbulent airflow is characterized by random fluctuations in the speed and direction of the airflow. Such turbulence can cause unwanted vibration of the disks and the heads, leading to undesirable track misregistration errors.

Figure 1A:
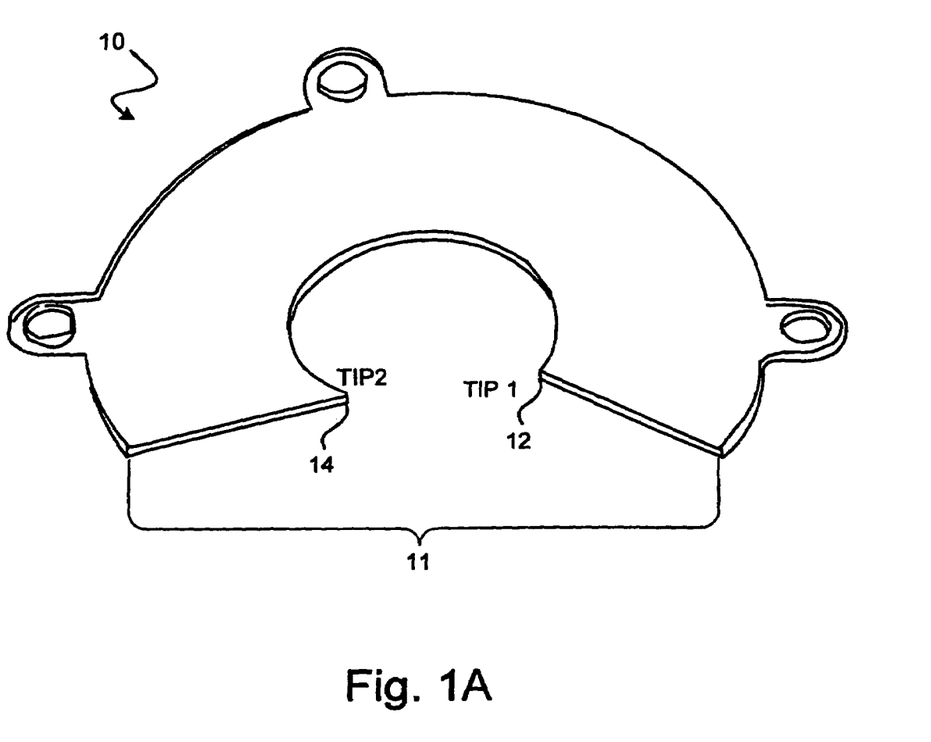
FIG. 1A is a perspective view of a conventional separator plate having an open region and two unsupported tips.

One way of counteracting this turbulent airflow, which has been used in the past, includes utilizing a separator plate mounted above and/or below a rotating disk to form a channel therebetween to provide air dampening and to thereby reduce air turbulence. These conventional separator plates typically include an open portion to accommodate the head stack assembly (HSA). For example, as shown in FIG. 1A, a separator plate 10 having an open portion 11 is illustrated. The separator plate 10 has a first unsupported tip 12 and a second unsupported tip 14 at opposite ends of the open portion 11. Unfortunately, the deflection of the first unsupported tip 12 and the second unsupported tip 14 of the separator plate 10 are relatively large in response to shock events, and therefore, a relatively large gap is required between the separator plate 10 and the rotating disk.

Figure 1B:
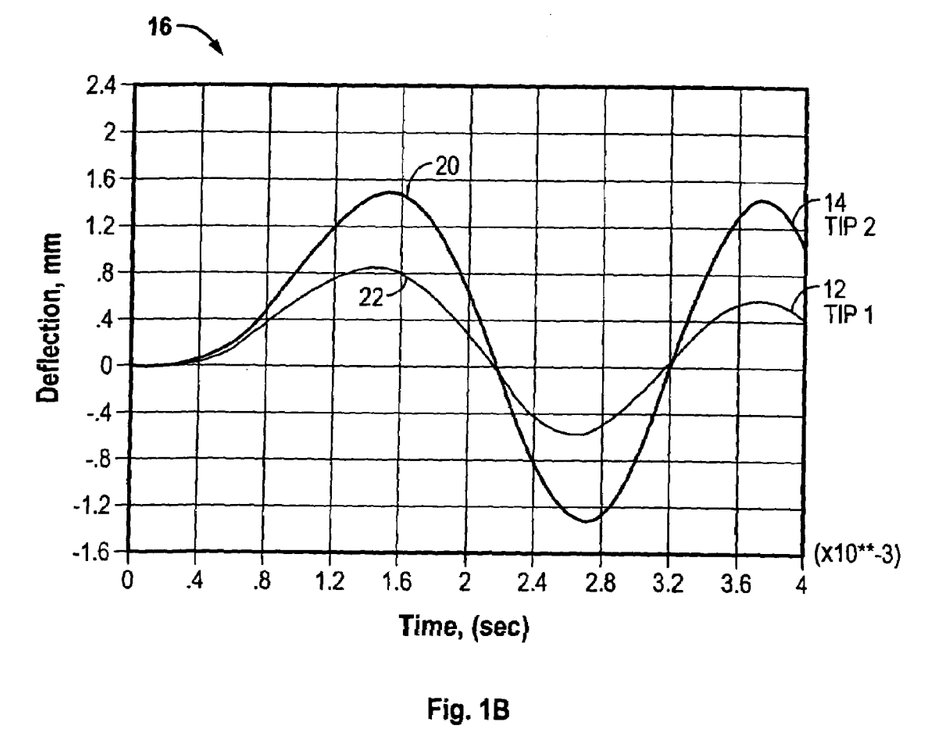
FIG. 1B is a graph illustrating the deflection of the unsupported tips of the conventional separator plate of FIG. 1, in response to a shock event.

For example, FIG. 1B is a graph 16 illustrating the deflection (in millimeters (mm)) of the first unsupported tip 12 and the second unsupported tip 14 of the separator plate 10 in response to a −300 G; two millisecond (ms) shock event, for a period of 4 ms. As can be seen in FIG. 1B, the second unsupported tip 14 varies between an approximate maximum +1.4 mm deflection and an approximate −1.3 mm deflection (plot line 20) and the first unsupported tip 12 varies between an approximate maximum +0.85 mm deflection and an approximate −0.6 mm deflection (plot line 22). Unfortunately, because of these relatively large deflections in response to a shock event, the gap between the separator plate and the rotating disk needs to be designed to be relatively large to accommodate these relatively large deflections.

SUMMARY OF THE INVENTION

The present invention relates to a continuous separator plate for use with a disk drive. More particularly, the present invention relates to a continuous separator plate for use with a disk drive that has improved shock resistance allowing for a smaller gap between the continuous separator plate and a rotating disk of the disk drive, which further provides for improved air dampening characteristics to aid in suppressing rotating disk and head vibration.

In one aspect, the invention may be regarded as a continuous separator plate for use with a disk drive. The disk drive includes a base, a cover, at least one disk mounted to a spindle motor for rotation within the disk drive, and a head stack assembly (HSA) including an actuator assembly pivotally coupled to the base of the disk drive to support a head gimbal assembly (HGA) having at least one head for writing and reading data to and from the at least one disk. The continuous separator plate includes a substantially circular continuous outer circumference and a substantially circular continuous inner circumference. A continuous radial portion may be defined between the substantially circular continuous outer circumference and the substantially circular continuous inner circumference. The continuous radial portion is to be disposed between the at least one disk of the disk drive and either the cover or the base of the disk drive, respectively. Further, the continuous radial portion includes a disk side that faces the at least one disk and an opposite side that faces either the cover or the base, respectively.

In one embodiment, the continuous separator plate includes an HSA accommodation section to accommodate the HSA. In one particular embodiment, the HSA accommodation section may include a limiter for the head, in which the limiter comprises a raised portion to limit vertical movement of the head when the head is in a landing zone of the disk. In one example of the HSA accommodation section, the HSA accommodation section may include a recessed portion formed within the continuous radial portion of the continuous separator plate on the disk side to accommodate the HSA. In this example, the opposite side of the continuous radial portion of the continuous separator plate is planar. In another example of the HSA accommodation section, the HSA accommodation section may include a stepped section to accommodate the HSA, in which the stepped section is raised relative to a non-stepped planar section of the opposite side of the continuous radial portion of the continuous separator plate.

In more detailed embodiments, the continuous separator plate may further include a spindle motor mounting opening defined by the substantially circular continuous inner circumference of the continuous separator plate to receive the spindle motor such that the continuous separator plate is mountable about the spindle motor. Further, the continuous separator plate may also include at least one mounting tab to mount the continuous separator plate to the base. In additional embodiments, the continuous separator plate may be formed from a metallic material, or, alternatively, may be formed from a plastic material. In even more detailed embodiments, the gap that is formed between the continuous separator plate and the at least one disk may be equal to approximately 0.4 mm. In another example, the gap that is formed between the continuous separator plate and the at least one disk may be equal to approximately 0.6 mm.

In another aspect, the invention may be regarded as a disk drive. The disk drive includes a base, a cover, at least one disk mounted to a spindle motor for rotation within the disk drive, a head stack assembly (HSA) including an actuator assembly pivotally coupled to the base of the disk drive to support a head gimbal assembly (HGA) having at least one head for writing and reading data to and from the at least one disk, and a continuous separator plate. The continuous separator plate includes a substantially circular continuous outer circumference and a substantially circular continuous inner circumference. A continuous radial portion may be defined between the substantially circular continuous outer circumference and the substantially circular continuous inner circumference. The continuous radial portion is to be disposed between the at least one disk of the disk drive and either the cover or the base of the disk drive, respectively. Further, the continuous radial portion includes a disk side that faces the at least one disk and an opposite side that faces either the cover or the base, respectively.

In one embodiment, the continuous separator plate includes an HSA accommodation section to accommodate the HSA. In one particular embodiment, the HSA accommodation section may include a limiter for the head, in which the limiter comprises a raised portion to limit vertical movement of the head when the head is in a landing zone of the disk. In one example of the HSA accommodation section, the HSA accommodation section may include a recessed portion formed within the continuous radial portion of the continuous separator plate on the disk side to accommodate the HSA. In this example, the opposite side of the continuous radial portion of the continuous separator plate is planar. In another example of the HSA accommodation section, the HSA accommodation section may include a stepped section to accommodate the HSA, in which the stepped section is raised relative to a non-stepped planar section of the opposite side of the continuous radial portion of the continuous separator plate.

In more detailed embodiments, the continuous separator plate may further include a spindle motor mounting opening defined by the substantially circular continuous inner circumference of the continuous separator plate to receive the spindle motor such that the continuous separator plate is mountable about the spindle motor. Further, the continuous separator plate may also include at least one mounting tab to mount the continuous separator plate to the base. In additional embodiments, the continuous separator plate may be formed from a metallic material, or, alternatively, may be formed from a plastic material. In even more detailed embodiments, the gap that is formed between the continuous separator plate and the at least one disk may be equal to approximately 0.4 mm. In another example, the gap that is formed between the continuous separator plate and the at least one disk may be equal to approximately 0.6 mm.

The foregoing and other features of the invention are described in detail below and are set forth in the appended claims.

DETAILED DESCRIPTION

The present invention relates to a continuous separator plate for use with a disk drive. More particularly, the present invention relates to a continuous separator plate for use with a disk drive that has improved shock resistance allowing for a smaller gap between the continuous separator plate and a rotating disk of the disk drive, which further provides for improved air dampening characteristics to aid in suppressing rotating disk and head vibration.

Figure 2:
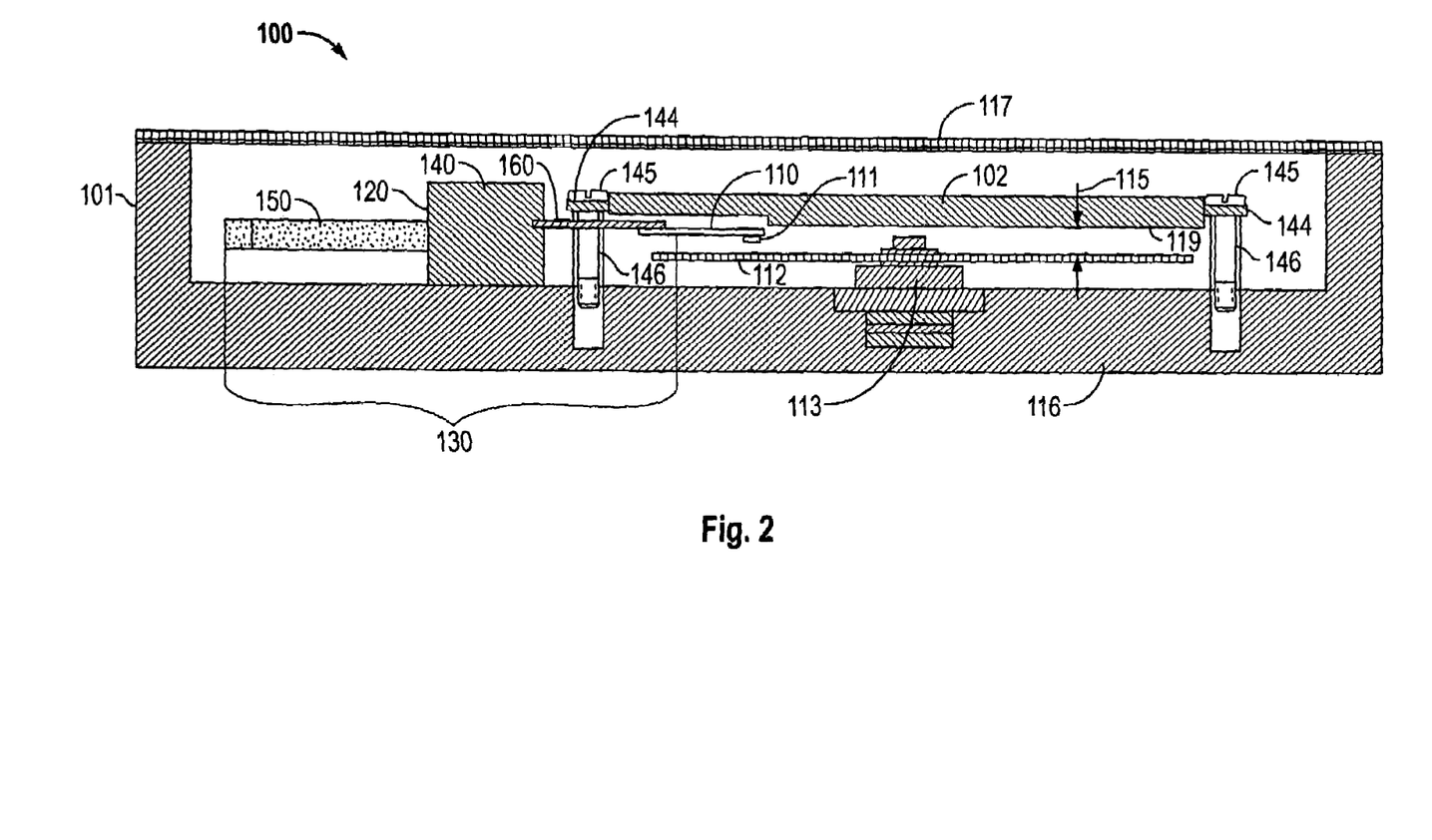
FIG. 2 is a side-sectional view of a hard disk drive (HDD), which includes a continuous separator plate that has improved shock resistance, according to one embodiment of the present invention.

With reference to FIG. 2, FIG. 2 is a perspective view of a hard disk drive (HDD) 100, which includes a continuous separator plate 102 that has improved shock resistance, according to one embodiment of the present invention. The disk drive 100 includes a head disk assembly (HDA) 101 and a printed circuit board assembly (PCBA) (not shown). As is known, the PCBA includes circuitry for processing signals and controlling the operations of the disk drive. The HDA 101 includes a base 116 and a separate cover 117 attached to the base 116 to collectively house either a single disk 112 or a disk stack including multiple disks, a spindle motor 113 attached to the base 116 for rotating the disk 112 (or disk stack), a head stack assembly (HSA) 120, and a pivot bearing cartridge (such as a stainless steel pivot bearing cartridge, for example) that rotatably supports the HSA 120 on the base 116. The base 116 is typically attached to the separate cover 117 by means of screws or other discrete fasteners. The spindle motor 113 rotates the disk 112 or disk stack at a constant angular velocity about a spindle motor rotation axis. Each disk utilized may include a plurality of recording surfaces for writing or reading data to or from the disk.

The HSA 120 comprises a swing-type or rotary actuator assembly 130, at least one head gimbal assembly (HGA) 110, and a flex circuit cable assembly (not shown). The flex circuit cable assembly includes a flex circuit cable and a flex clamp. As is typical with present HSA's, the rotary actuator assembly 130 includes a body portion 140 having a pivot bore for receipt of the pivot-bearing cartridge, at least one actuator arm 160 cantilevered from the body portion 140, and a coil portion 150 cantilevered from the body portion 140 in an opposite direction from the actuator arm 160. The actuator arm 160 supports the HGA 110 having a load beam that supports a head 111 for writing and reading data to and from the disk. For example, the head can include an inductive head that is used to both read and write data on a recording surface of a disk, or a magnetoresistance (MR) head, which includes an MR head element to read data and an inductive element to write data.

The HSA 120 is pivotally secured to the base 116 via a pivot-bearing cartridge mounted through the pivot bore of the body portion 140 of the HSA 120 forming a pivot axis such that the head 111 at the distal end of the HGA 110 may be moved over a recording surface of a disk. The pivot-bearing cartridge enables the HSA 120 to pivot about the pivot axis. The storage capacity of the HDA 101 may be increased by the use of additional disks in a disk stack and by the HSA 120 having a vertical stack of HGAs supported by multiple actuator arms.

Although not particularly shown in FIG. 2, as is known, a voice coil motor (VCM) plate assembly including top and bottom VCM plates may also be mounted to the base. Suitably, one or both of the VCM plates includes a permanent magnet. The coil portion 150 of the actuator assembly 130 is disposed between the top and bottom VCM plates in order to form a voice coil motor to cause the pivoting of the HSA 120 about the pivot axis defined by the pivot bearing cartridge. Thus, the voice coil motor can be used to controllably position the head(s) of the HSA relative to the disk(s) for writing and/or reading data. As should be appreciated, multiple disks and HSA's having multiple HGA's and multiple heads may be utilized in the disk drive 100 having a continuous separator plate 102, according to embodiments of the present invention.

As shown in FIG. 2, the continuous separator plate 102 may be mounted between the disk 112 of the disk drive 100 and the cover 117 of the disk drive 100. Alternatively, or in addition to, the continuous separator plate 102 may be mounted between the disk 112 of the disk drive 100 and the base 116 of the disk drive 100. As will be discussed in more detail later, the continuous separator plate 102 includes a continuous radial portion that has a disk side that faces the disk and an opposite side that faces either the cover or the base, respectively. The continuous separator plate 102 includes mounting tabs 144 through which screws 145 or other types of fasteners may be mounted to fixedly mount the continuous separator plate 102 to the base 116, so that the continuous separator plate 102 is constrained from rotating due to forces, such as, shock events and airflow within disk drive.

In one example, as shown in FIG. 2, screws 145 or other types of fasteners may be inserted through mounting tabs 145 of the continuous separator plate 102. The screws 145 may be threaded into threaded receiving bores in the base 116. Further, bosses or sleeves 146 (e.g. plastic or metal), may also be mounted to the base 116 to receive the screws 145, respectively. However, it should be appreciated that this is just an example, and that many other methods of mounting the continuous separator plate 102 to the base 116 of the disk drive 100 should be apparent to those skilled in the art.

In some embodiments, the continuous separator plate 102 is mounted such that a small gap 115 is formed between disk side 119 of the continuous separator plate 102 and the disk 112 forming a small channel therebetween to induce laminar non-turbulent airflow and to provide for improved air dampening characteristics to aid in suppressing rotating disk and head vibration. Particularly, the small gap 115 may induce laminar non-turbulent airflow about the about the disk 112, HSA 120, and head 111 such that undesirable track misregistration (TMR) errors may be minimized. In some embodiments, the gap 115 is less than 0.625 mm. For example, the gap 115 that is formed between the continuous separator plate 102 and the disk 112 may be equal to approximately 0.4 mm or may be equal to approximately 0.6 mm, or other sizes.

Figure 3A:
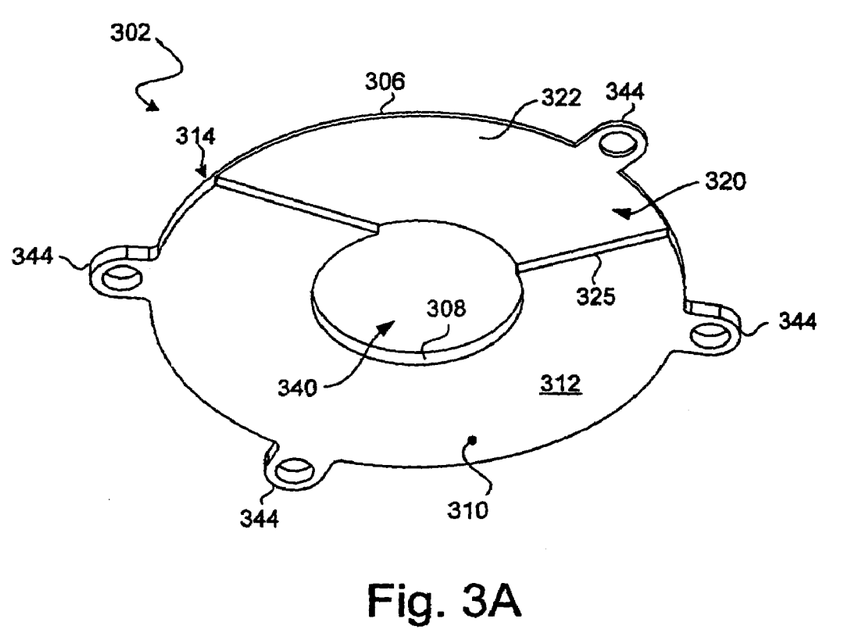
FIG. 3A is a perspective view showing one example of a continuous separator plate having an HSA accommodation section including a recessed portion, according to one embodiment of the present invention.

Turning now to FIG. 3A, FIG. 3A is a perspective view showing one example of a continuous separator plate 302 having an HSA accommodation section 320 including a recessed portion 322, according to one embodiment of the present invention. The continuous separator plate 302 includes a substantially circular continuous outer circumference 306 and a substantially circular continuous inner circumference 308. A continuous radial portion 310 is defined between the substantially circular continuous outer circumference 306 and the substantially circular continuous inner circumference 308. The continuous radial portion 310 is to be disposed between a disk of the disk drive and either the cover or the base of the disk drive, respectively, as previously discussed. Further, the continuous radial portion 310 includes a disk side 312 that faces the disk and an opposite side 314 that faces either the cover or the base, respectively, depending on the configuration of the continuous separator plate 302 within the disk drive.

In one embodiment, the continuous separator plate 302 includes an HSA accommodation section 320 to accommodate the HSA. The HSA accommodation section 320 allows for the rotation of the actuator assembly such that the head of the HGA can be rotated relative to the disk. In one example of the HSA accommodation section 320, the HSA accommodation section 320 may include a recessed portion 322 formed within the continuous radial portion 310 of the continuous separator plate 302, on the disk side 312, to accommodate the HSA. Particularly, the HSA accommodation section 320 includes a flat planar recessed portion 322 recessed from the rest of the flat planar disk side 312 of the continuous radial portion 310 and two sidewalls 325 connecting the recessed portion 322 to the rest of the flat planar disk side 312 of the continuous radial portion 310 of the continuous separator plate 302. Further, although not particularly shown, the opposite side 314 of the continuous radial portion 310 of the continuous separator plate 302 may also be planar.

As previously discussed, with reference to FIG. 2, the continuous separator plate 302 may be mounted between a disk of the disk drive and the cover and/or the base of the disk drive by mounting tabs 344. The mounting tabs 344 each respectively extend outward from the outer circumference 306 of the continuous separator plate 302. As previously discussed, screws or other types of fasteners may be respectively mounted through each mounting tab 344 to fixedly mount the continuous separator plate 302 to the base. In this way, the continuous separator plate 302 is constrained from rotational displacement due to forces, such as, shock events and airflow within the disk drive. Also, the continuous separator plate 302 further includes a spindle motor mounting opening 340 defined by the substantially circular continuous inner circumference 308 of the continuous separator plate 302 to receive the spindle motor such that the continuous separator plate is mountable about the spindle motor. However, although the continuous separator plate 302 is fixedly mounted to the base, the inner circumference 308 of the continuous separator plate 302 does not contact or engage the spindle motor.

Further, the continuous separator plate 302 is mounted such that a small gap is formed between the disk side 312 of the continuous separator plate 302 and the disk forming a small channel therebetween to induce laminar non-turbulent airflow and to provide for improved air dampening characteristics to aid in suppressing rotating disk and head vibration. Particularly, the small gap may induce laminar non-turbulent airflow about the about the disk, HSA, and head such that undesirable track misregistration (TMR) errors may be minimized. In some embodiments, the gap is less than 0.625 mm. For example, the gap that is formed between the continuous separator plate and the disk may be equal to approximately 0.4 mm or may be equal to approximately 0.6 mm, or other sizes.

It should be appreciated that the continuous separator plate 302 may be formed from a metallic material, or, alternatively, may be formed from a plastic material, or even in some embodiments, a combination thereof. In one embodiment, the configuration of the continuous separator plate 302 lends itself to be efficiently manufactured by coining or compression manufacturing techniques and it can be formed from suitable metallic materials such as aluminum or stainless steel. Alternatively, the continuous separator plate 302 may formed from a plastic material such as by a plastic injection molding manufacturing process.

Also, in one embodiment, the non-recessed portion of the continuous radial portion 310 of the continuous separator plate 302 may be approximately 2.5 mm thick and the recessed portion 322 may be approximately 1.5 mm thick. Thus, the non-recessed portion of the continuous radial portion 310 and the recessed portion 322 are of non-uniform thickness. Further, because of the reduced overall thickness of the continuous separator plate 302 and the small gap between the continuous separator plate 302 and the disk previously discussed, in addition to the reduction in turbulent airflow and those associated advantages previously discussed, space savings are provided which allow for more disks to be utilized as part of a disk stack if desired.

Figure 3B:
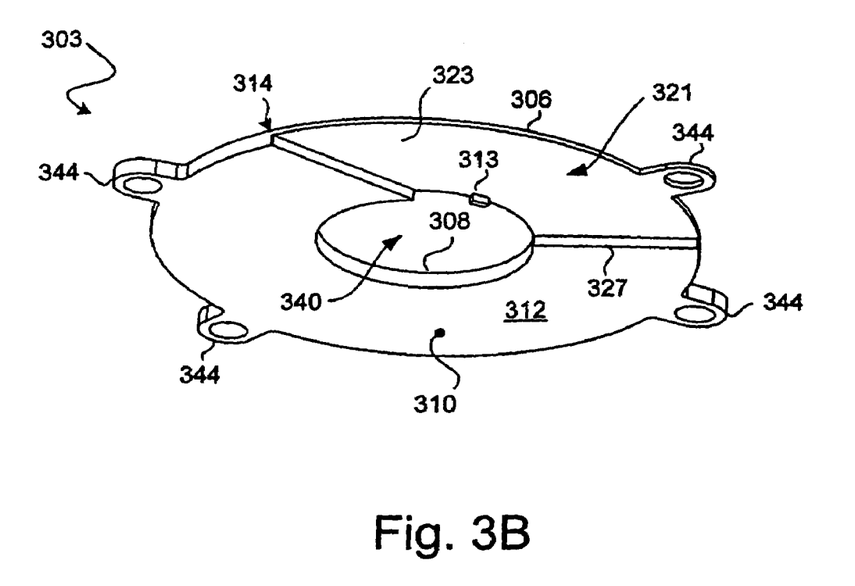
FIG. 3B is a perspective view showing a variation of the example of the continuous separator plate having an HSA accommodation section including a recessed portion of FIG. 3A, which further includes a limiter for the head of the HSA, according to one embodiment of the present invention.

With reference now to FIG. 3B, FIG. 3B is a perspective view showing a variation of the example of the continuous separator plate having an HSA accommodation section including a recessed portion of FIG. 3A, which further includes a limiter 313 for the head of the HSA, according to one embodiment of the present invention. The continuous separator plate 303 of FIG. 3B includes a substantially circular continuous outer circumference 306 and a substantially circular continuous inner circumference 308. A continuous radial portion 310 is defined between the substantially circular continuous outer circumference 308 and the substantially circular continuous inner circumference 306. The continuous radial portion 310 is to be disposed between a disk of the disk drive and either the cover or the base of the disk drive, respectively, as previously discussed. Further, the continuous radial portion 310 includes a disk side 312 that faces the disk and an opposite side 314 that faces either the cover or the base, respectively, depending on the configuration of the continuous separator plate 303 within the disk drive.

In one embodiment, the continuous separator plate 303 includes an HSA accommodation section 321 to accommodate the HSA. The HSA accommodation section 321 allows for the rotation of the actuator assembly such that head of the HGA can be rotated relative to the disk. In one example of the HSA accommodation section 321, the HSA accommodation section 321 may include a recessed portion 323 formed within the continuous radial portion 310 of the continuous separator plate 303, on the disk side 312, to accommodate the HSA. Particularly, the HSA accommodation section 321 includes a flat planar recessed portion 323 recessed from the rest of the flat planar disk side 312 of the continuous radial portion 310 and two sidewalls 327 connecting the recessed portion 323 to the rest of the flat planar disk side 312 of the continuous radial portion 310 of the continuous separator plate 302. Further, although not particularly shown, the opposite side 314 of the continuous radial portion 310 of the continuous separator plate 303 may also be planar.

Figure 3C:
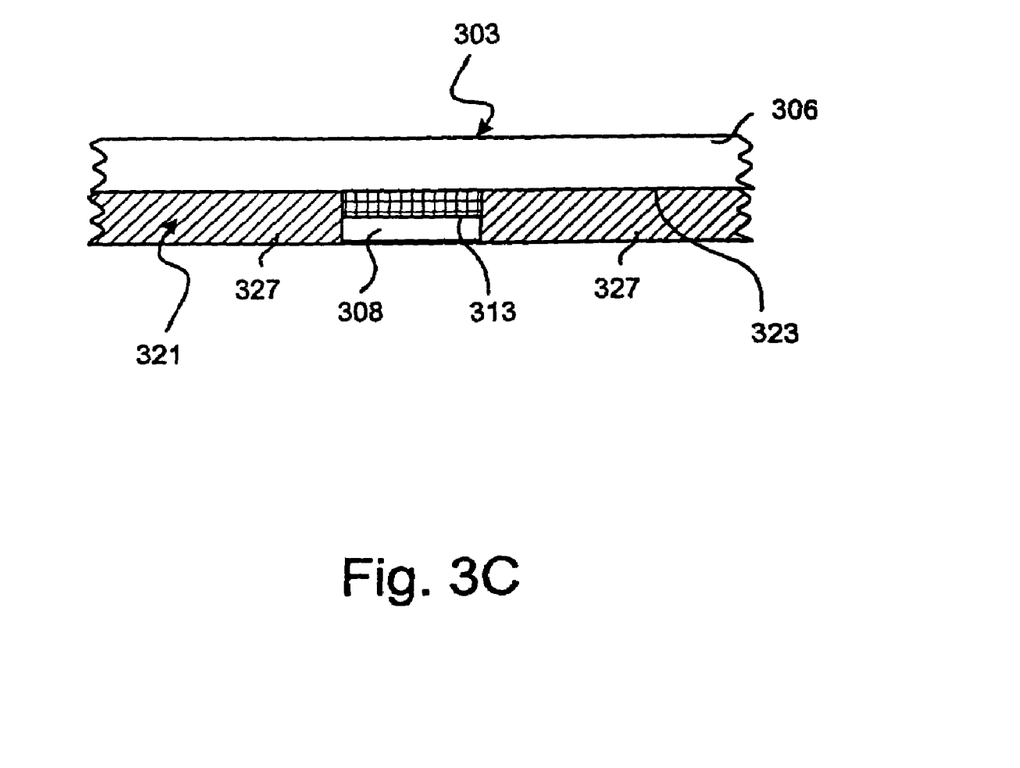
FIG. 3C is a partial side view of FIG. 3B, particularly showing the limiter of the HSA accommodation section, according to one embodiment of the present invention.

Moreover, in this embodiment, the recessed portion 323 of the HSA accommodation section 321 may include a limiter 313. For example, the limiter 313 may comprise a raised portion to limit vertical movement of the head when the head is in a landing zone of the disk. Particularly, the limiter 313 may be an approximately arcuate-shaped structure that is raised relative to the rest of the recessed portion 323 of the HSA accommodation section 321; but the limiter 313 is still recessed relative to the rest of the flat planar disk side 312 of the continuous radial portion 310 of the continuous separator plate 303. For example, in one embodiment, the limiter 313 may be approximately 80% of the height between the surface of the recessed portion 323 of the HSA accommodation section 321 and the surface of the disk side 312 of the continuous radial portion 310 of the continuous separator plate 303. The limiter 313 suitably supports the head of the HGA when the head of the HGA is parked towards the inner diameter of the disk (i.e. in the landing zone of the disk) when the disk drive is powered down, and may usefully limit or constrain the vertical movement of the head when the head is subjected to a non-operational shock event. Turning briefly to FIG. 3C, FIG. 3C is a partial side view of FIG. 3B, particularly showing the limiter 313 of the HSA accommodation section 321 of the recessed portion 323 of the continuous separator plate 303, according to one embodiment of the present invention.

As previously discussed, with reference to FIG. 2, the continuous separator plate 303 may be mounted between a disk of the disk drive and the cover and/or the base of the disk drive by mounting tabs 344. The mounting tabs 344 each respectively extend outward from the outer circumference 306 of the continuous separator plate 303. As previously discussed, screws or other types of fasteners may be respectively mounted through each mounting tab 344 to fixedly mount the continuous separator plate 303 to the base. In this way, the continuous separator plate 303 is constrained from rotational displacement due to forces, such as, shock events and airflow within the disk drive. Also, the continuous separator plate 303 further includes a spindle motor mounting opening 340 defined by the substantially circular continuous inner circumference 308 of the continuous separator plate 303 to receive the spindle motor such that the continuous separator plate is mountable about the spindle motor. However, although the continuous separator plate 303 is fixedly mounted to the base, the inner circumference 308 of the continuous separator plate 303 does not contact or engage the spindle motor.

Further, the continuous separator plate 303 is mounted such that a small gap is formed between the disk side 312 of the continuous separator plate 303 and the disk forming a small channel therebetween to induce laminar non-turbulent airflow and to provide for improved air dampening characteristics to aid in suppressing rotating disk and head vibration. Particularly, the small gap may induce laminar non-turbulent airflow about the about the disk, HSA, and head such that undesirable track misregistration (TMR) errors may be minimized. In some embodiments, the gap is less than 0.625 mm. For example, the gap that is formed between the continuous separator plate and the disk may be equal to approximately 0.4 mm or may be equal to approximately 0.6 mm, or other sizes.

It should be appreciated that the continuous separator plate 303 may be formed from a metallic material, or, alternatively, may be formed from a plastic material, or even in some embodiments, a combination thereof. In one embodiment, the configuration of the continuous separator plate 303 lends itself to be efficiently manufactured by coining or compression manufacturing techniques and it can be formed from suitable metallic materials such as aluminum or stainless steel. Alternatively, the continuous separator plate 303 may formed from a plastic material such as by a plastic injection molding manufacturing process.

Also, in one embodiment, the non-recessed portion of the continuous radial portion 310 of the continuous separator plate 303 may be approximately 2.5 mm thick and the recessed portion 323 may be approximately 1.5 mm thick. Thus, the non-recessed portion of the continuous radial portion 310 and the recessed portion 323 are of non-uniform thickness. Further, because of the reduced overall thickness of the continuous separator plate 303 and the small gap between the continuous separator plate 303 and the disk previously discussed, in addition to the reduction in turbulent airflow and those associated advantages previously discussed, space savings are provided which allow for more disks to be utilized as part of the disk stack if desired.

Figure 4:
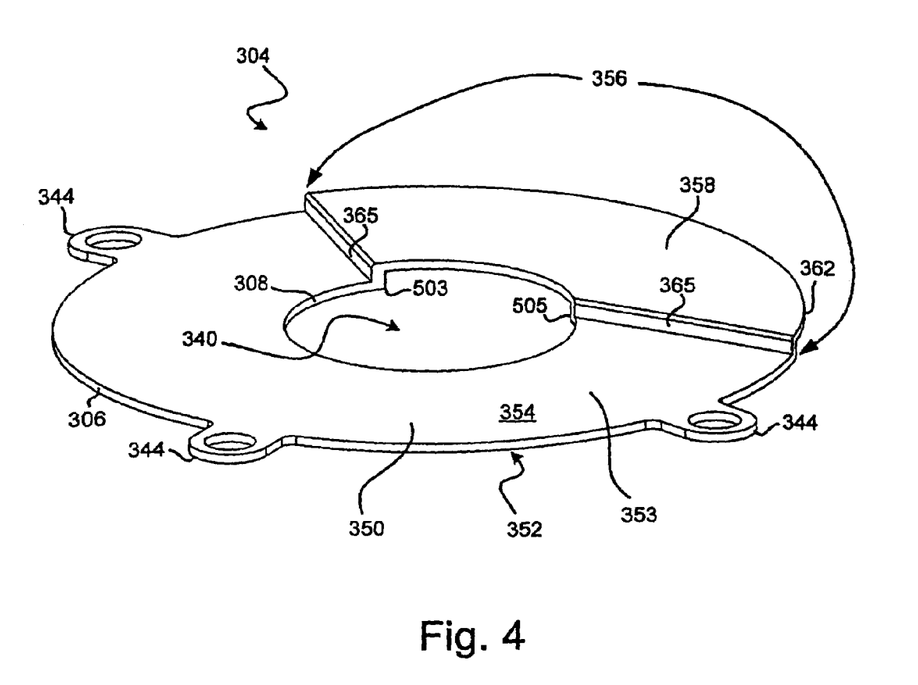
FIG. 4 is a perspective view showing another example of a continuous separator plate having an HSA accommodation section that includes a stepped section, according to one embodiment of the present invention.

Turning now to FIG. 4, FIG. 4 is a perspective view showing another example of a continuous separator plate 304 having an HSA accommodation section 356 that includes a stepped section 358, according to one embodiment of the present invention. The continuous separator plate 304 includes a substantially circular continuous outer circumference 306 and a substantially circular continuous inner circumference 308. A continuous radial portion 350 is defined between the substantially circular continuous outer circumference 308 and the substantially circular continuous inner circumference 306. The continuous radial portion 350 is to be disposed between a disk of the disk drive and either the cover or the base of the disk drive, respectively, as previously discussed. Further, the continuous radial portion 350 includes a disk side 352 that faces the disk and an opposite side 354 that faces either the cover or the base, respectively, depending on the configuration of the continuous separator plate 350 within the disk drive.

In one embodiment, the continuous separator plate 304 includes an HSA accommodation section 356 to accommodate the HSA. The HSA accommodation section 356 allows for the rotation of the actuator assembly such that head of the HGA can be rotated relative to the disk. In one example of the HSA accommodation section 356, the HSA accommodation section 356 may include a stepped section 358 to accommodate the HSA, in which the stepped section 358 is raised relative to a non-stepped planar section 353 of the opposite side 354 of the continuous radial portion 350 of the continuous separator plate 356. Particularly, the HSA accommodation section 356 includes a stepped section 358 that is raised from the rest of the non-stepped planar section 353 of the opposite side 354 of the continuous radial portion 350. Two sidewalls 365 connect the stepped section 358 to the rest of the non-stepped planar section 353 of the continuous separator plate 304. Further, although not particularly shown, the HSA accommodation section 356 including the stepped section 358 and the two sidewalls 325 provides a raised recessed area 362 (not shown) relative to the rest of the disk side 352 of the non-stepped planar section 353 of the continuous radial portion 350 of the continuous separator plate 304, to provide for the rotation of the actuator assembly such that head of the HGA can be rotated relative to the disk. Also, it should be appreciated that the non-stepped planar section 353 of the disk side 352 may also be planar.

As previously discussed, with reference to FIG. 2, the continuous separator plate 304 may be mounted between the disk of the disk drive and the cover and/or the base of the disk drive by mounting tabs 344. The mounting tabs 344 each respectively extend outward from the outer circumference 306 of the continuous separator plate 304. As previously discussed, screws or other types of fasteners may be respectively mounted through each mounting tab 344 to fixedly mount the continuous separator plate 304 to the base. In this way, the continuous separator plate 304 is constrained from rotational displacement due to forces, such as, shock events and airflow within the disk drive. Also, the continuous separator plate 304 further includes a spindle motor mounting opening 340 defined by the substantially circular continuous inner circumference 308 of the continuous separator plate 304 to receive the spindle motor such that the continuous separator plate is mountable about the spindle motor. However, although the continuous separator plate 304 is fixedly mounted to the base, the inner circumference 308 of the continuous separator plate 304 does not contact or engage the spindle motor.

Further, the continuous separator plate 304 is mounted such that a small gap is formed between disk side 352 of the continuous separator plate 304 and the disk forming a small channel therebetween to induce laminar non-turbulent airflow and to provide for improved air dampening characteristics to aid in suppressing rotating disk and head vibration. Particularly, the small gap may induce laminar non-turbulent airflow about the about the disk, HSA, and head such that undesirable track misregistration (TMR) errors may be minimized. In some embodiments, the gap is less than 0.625 mm. For example, the gap that is formed between the continuous separator plate and the disk may be equal to approximately 0.4 mm or may be equal to approximately 0.6 mm, or other sizes.

It should be appreciated that the continuous separator plate 304 may be formed from a metallic material, or, alternatively, may be formed from a plastic material, or even in some embodiments, a combination thereof. In one embodiment, the configuration of the continuous separator plate 304 lends itself to be efficiently manufactured by a stamping manufacturing techniques and it can be formed from suitable metallic materials such as aluminum or stainless steel. Alternatively, the continuous separator plate 304 may formed from a plastic material such as by a plastic injection molding manufacturing process.

Also, in one embodiment, the non-stepped planar section 353 of the continuous radial portion 350 of the continuous separator plate 304 may be approximately 1.5 mm thick and the stepped section 358 may be approximately 1.5 mm thick. Thus, the non-stepped planar section 353 of the continuous radial portion 350 and the stepped section 358 are of uniform thickness. Further, because of the reduced overall thickness of the continuous separator plate 304 and the small gap between the continuous separator plate 304 and the disk previously discussed, in addition to the reduction in turbulent airflow and those associated advantages previously discussed, space savings are provided which allow for more disks to be utilized as part of the disk stack if desired.

Figure 5:
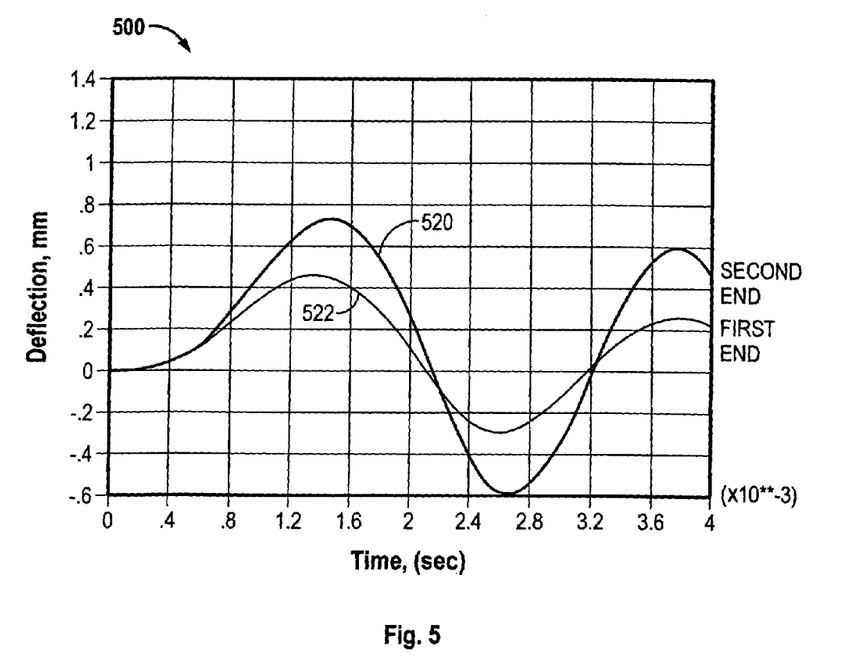
FIG. 5 is a graph illustrating the deflection of the continuous separator plate, according to embodiments of the present invention, in response to a shock event.

FIG. 5 is a graph illustrating an example of the deflection of a continuous separator plate, according to embodiments of the present invention, in response to a shock event. Embodiments of the invention relating to a continuous separator plate for use with a disk drive provide for reduced deflection in response to shock events, which ultimately allows for a smaller gap to be used between the continuous separator plate and a rotating disk of the disk drive and further provides for improved air dampening characteristics to aid in suppressing rotating disk and head vibration.

For example, FIG. 5 is a graph 500 illustrating the deflection (in millimeters (mm)) of the first and second ends, respectively, of a respective HSA accommodation section (e.g. either formed by a recessed portion or a stepped section); wherein the ends are defined as being the points where the respective recessed portion or stepped section of the HSA accommodation section deviates from the rest of the non-stepped planar section or non-recessed planar portion of the continuous radial portion of the continuous separator plate at the inner circumference, respectively. For example, referring briefly to FIG. 4, first end 503 and second end 505 may be utilized as an example. Particularly, graph 500 illustrates the deflection of the first and second ends of a continuous separator plate in response to a −300 G; two millisecond (ms) shock event, for a period of 4 ms. As can be seen in FIG. 5, the second end varies between an approximate maximum +0.75 mm deflection and an approximate −0.6 mm deflection (plot line 520) and the first end varies between an approximate maximum +0.45 mm deflection and an approximate −0.3 mm deflection (plot line 522).

In comparison to other types of conventional separator plates, such as the separator plate previously described with reference to FIGS. 1A and 1B, having unsupported tips, the deflection of the ends of the continuous separator plate are approximately 50% less. Thus, because of these relatively small deflections in response to a shock event, the gap between the separator plate and the rotating disk can be advantageously reduced. By having a small gap, a small channel is formed between the continuous separator plate and the rotating disk such that laminar non-turbulent airflow about the disk, HSA, and head is induced. Thus, the small gap provides for improved air dampening characteristics to aid in suppressing rotating disk and head vibration. Accordingly, because of the suppression of rotating disk and head vibration undesirable track misregistration (TMR) errors may be minimized.

It should be appreciated that other modifications and embodiments will occur to those of skill in this art and all such modifications and other embodiments are deemed to fall within the scope of the present invention.

We claim:

1. A disk drive comprising:
   a base;
   a cover;
   at least one disk mounted to a spindle motor for rotation within the disk drive;
   a head stack assembly (HSA) including an actuator assembly pivotally coupled to the base of the disk drive to support a head gimbal assembly (HGA) having at least one head for writing and reading data to and from the at least one disk;
   a continuous separator plate including a substantially circular continuous outer circumference, a substantially circular continuous inner circumference, and a continuous radial portion defined between the substantially circular continuous outer circumference and the substantially circular continuous inner circumference, wherein the continuous radial portion is to be disposed between the at least one disk of the disk drive and one of the cover or the base of the disk drive and includes a disk side that faces the at least one disk and an opposite side that faces one of the cover or the base, respectively; and an HSA accommodation section of the continuous radial portion to accommodate the HSA including a stepped section to accommodate the HSA, the stepped section being raised relative to a non-stepped planar section of the opposite side of the continuous radial portion of the continuous separator plate.

2. The disk drive of claim 1, wherein the continuous separator plate further comprises a spindle motor mounting opening defined by the substantially circular continuous inner circumference of the continuous separator plate to receive the spindle motor such that the continuous separator plate is mountable about the spindle motor.

3. The disk drive of claim 1, wherein the continuous separator plate further comprises at least one mounting tab to mount the continuous separator plate to the base.

4. The disk drive of claim 1, wherein the continuous separator plate is formed from a metallic material.

5. The disk drive of claim 1, wherein the continuous separator plate is formed from a plastic material.

6. The disk drive of claim 1, wherein a gap is formed between the continuous separator plate and the at least one disk that is equal to approximately 0.4 millimeters.

7. The disk drive of claim 1, wherein a gap is formed between the continuous separator plate and the at least one disk that is equal to approximately 0.6 millimeters.

8. A disk drive comprising:

a base;

a cover;

at least one disk mounted to a spindle motor for rotation within the disk drive;

a head stack assembly (HSA) including an actuator assembly pivotally coupled to the base of the disk drive to support a head gimbal assembly (HGA) having at least one head for writing and reading data to and from the at least one disk;

a continuous separator plate including a substantially circular continuous outer circumference, a substantially circular continuous inner circumference, and a continuous radial portion defined between the substantially circular continuous outer circumference and the substantially circular continuous inner circumference, wherein the continuous radial portion is to be disposed between the at least one disk of the disk drive and one of the cover or the base of the disk drive and includes a disk side that faces the at least one disk and an opposite side that faces one of the cover or the base, respectively; and an HSA accommodation section to accommodate the HSA having a limiter including a raised portion to limit vertical movement of the head when the head is in a landing zone of the disk.

9. The disk drive of claim 8, wherein the HSA accommodation section includes a recessed portion formed within the continuous radial portion of the continuous separator plate on the disk side to accommodate the HSA.

10. The disk drive of claim 9, wherein the opposite side of the continuous radial portion of the continuous separator plate is planar.

11. The disk drive of claim 8, wherein the HSA accommodation section of the continuous radial portion of the continuous separator plate includes a stepped section to accommodate the HSA, the stepped section being raised relative to a non-stepped planar section of the opposite side of the continuous radial portion of the continuous separator plate.

12. The disk drive of claim 8, wherein the continuous separator plate further comprises a spindle motor mounting opening defined by the substantially circular continuous inner circumference of the continuous separator plate to receive the spindle motor such that the continuous separator plate is mountable about the spindle motor.

13. The disk drive of claim 8, wherein the continuous separator plate further comprises at least one mounting tab to mount the continuous separator plate to the base.

14. The disk drive of claim 8, wherein the continuous separator plate is formed from a metallic material.

15. The disk drive of claim 8, wherein the continuous separator plate is formed from a plastic material.

16. The disk drive of claim 8, wherein a gap is formed between the continuous separator plate and the at least one disk that is equal to approximately 0.4 millimeters.

17. The disk drive of claim 8, wherein a gap is formed between the continuous separator plate and the at least one disk that is equal to approximately 0.6 millimeters.

18. A disk drive comprising:

a base;

a cover;

at least one disk mounted to a spindle motor for rotation within the disk drive;

a head stack assembly (HSA) including an actuator assembly pivotally coupled to the base of the disk drive to support a head gimbal assembly (HGA) having at least one head for writing and reading data to and from the at least one disk;

a continuous separator plate including a substantially circular continuous outer circumference, a substantially circular continuous inner circumference, and a continuous radial portion defined between the substantially circular continuous outer circumference and the substantially circular continuous inner circumference, wherein the continuous radial portion is to be disposed between the at least one disk of the disk drive and one of the cover or the base of the disk drive and includes a disk side that faces the at least one disk and an opposite side that faces one of the cover or the base, respectively; and an HSA accommodation section including a recessed portion formed within the continuous radial portion on the disk side to accommodate the HSA, the recessed portion being recessed relative to a non-recessed planar section of the disk side of the continuous radial portion of the continuous separator plate.

19. The disk drive of claim 18, wherein the HSA accommodation section includes a limiter comprising a raised portion to limit vertical movement of the head when the head is in a landing zone of the disk.

20. The disk drive of claim 18, wherein the opposite side of the continuous radial portion of the continuous separator plate is planar.

21. The disk drive of claim 18, wherein the continuous separator plate further comprises a spindle motor mounting opening defined by the substantially circular continuous inner circumference of the continuous separator plate to receive the spindle motor such that the continuous separator plate is mountable about the spindle motor.

22. The disk drive of claim 18, wherein the continuous separator plate further comprises at least one mounting tab to mount the continuous separator plate to the base.

23. The disk drive of claim 18, wherein the continuous separator plate is formed from a metallic material.

24. The disk drive of claim 18, wherein the continuous separator plate is formed from a plastic material.

25. The disk drive of claim 18, wherein a gap is formed between the continuous separator plate and the at least one disk that is equal to approximately 0.4 millimeters.

26. The disk drive of claim 18, wherein a gap is formed between the continuous separator plate and the at least one disk that is equal to approximately 0.6 millimeters.

\* \* \* \* \*